United States Patent
Rachman et al.

(10) Patent No.: US 12,499,248 B2
(45) Date of Patent: Dec. 16, 2025

(54) SYSTEMS AND METHODS FOR BREACH-PROOF, RESILIENT, COMPLIANT DATA IN A MULTI-VENDOR CLOUD ENVIRONMENT AND AUTOMATICALLY SELF HEALS IN THE EVENT OF A RANSOMWARE ATTACK

(71) Applicant: CALAMU TECHNOLOGIES CORPORATION, Asbury, NJ (US)

(72) Inventors: Ophir Rachman, Sunnyvale, CA (US); Eric Sites, Palm Harbor, FL (US); Matthew Wilkinson, Gainesville, FL (US); Blake Emmons, Louisville, KY (US); Matt Meuse, Quechee, VT (US); Kelly McLaughlin, South Plainfield, NJ (US); Lauren Miehe, East Wenatchee, WA (US); Paul Lewis, Asbury, NJ (US)

(73) Assignee: CALAMU TECHNOLOGIES CORPORATION

( * ) Notice: Subject to any disclaimer, the term of this patent is extended or adjusted under 35 U.S.C. 154(b) by 82 days.

(21) Appl. No.: 18/655,439

(22) Filed: May 6, 2024

(65) Prior Publication Data

US 2024/0330486 A1    Oct. 3, 2024

Related U.S. Application Data

(63) Continuation-in-part of application No. 18/124,009, filed on Mar. 21, 2023, now abandoned, which is a
(Continued)

(51) Int. Cl.
G06F 21/60    (2013.01)
G06F 3/06    (2006.01)
(Continued)

(52) U.S. Cl.
CPC .......... *G06F 21/602* (2013.01); *G06F 3/062* (2013.01); *G06F 3/064* (2013.01); *G06F 3/067* (2013.01);
(Continued)

(58) Field of Classification Search
CPC . H04L 9/0861; H04L 9/0819; H04L 67/1097; H04L 63/0428; H04L 63/08;
(Continued)

(56) References Cited

U.S. PATENT DOCUMENTS 7,103,558 B1    9/2006 Patton et al.
7,574,579 B2    8/2009 Gladwin et al.
(Continued)

FOREIGN PATENT DOCUMENTS

WO    2013101085 A1    7/2013
WO    2016003969 A2    1/2016
WO    2018031342 A1    2/2018

OTHER PUBLICATIONS

International Search Report and Written Opinion issued on Dec. 24, 2015 for International Application No. PCT/US2015/038433, pp. 6.
(Continued)

*Primary Examiner* — Dao Q Ho
(74) *Attorney, Agent, or Firm* — Gearhart Law LLC

(57) ABSTRACT

A cloud-based system and method for securely storing data formed into cloud technology-specific data objects (hereinafter, "buckets") by an S3 gateway, comprising obtaining a source data bucket from the S3 gateway; splitting the data bucket into at least three fragments; encrypting the fragments using an encryption key associated with the fragments and distributing the encrypted fragments among at least three cloud storage providers, and creating a pointer file containing information for retrieving the encrypted fragments. When a system user requests access to the data, the
(Continued)

Solution – Restore Control (2 of 2)
• If it is identified as a request from a specific backup software, the file requested is matched against the appropriate whitelist:
  ○ If there is a match, the request is granted without an MFA process (as this is part of a backup, not a restore)
  ○ If there is no match, a Restore Control MFA process starts:
    ■ A Restore Control request appears in the management console
    ■ A Restore Control notification is sent to the appropriate user(s); those that have the rights to reconstitute
    ■ One of the users needs to login to the management console via an MFA process and approve the Restore Control request.
    ■ The approving users can approve the request for a specific time period to allow the restore request to continue without interruptions and to complete for other files system ensures the request is legitimate, then uses the information stored in the pointer file to retrieve the stored encrypted bucket fragments from the plurality of clouds, decrypts the fragments and reconstructs the data buckets, and provides data access to the S3 gateway.

16 Claims, 15 Drawing Sheets

Related U.S. Application Data continuation of application No. 17/211,919, filed on Mar. 25, 2021, now Pat. No. 11,636,217, which is a continuation-in-part of application No. 16/261,720, filed on Jan. 30, 2019, now Pat. No. 10,984,116, which is a continuation-in-part of application No. 16/055,587, filed on Aug. 6, 2018, now abandoned, which is a continuation of application No. 15/226,237, filed on Aug. 2, 2016, now Pat. No. 10,043,017, which is a continuation of application No. 14/251,612, filed on Jun. 30, 2014, now Pat. No. 9,405,926.

(51) Int. Cl.
| | | |
|---|---|---|
| *G06F 21/62* | (2013.01) | |
| *H04L 9/08* | (2006.01) | |
| *H04L 9/14* | (2006.01) | |
| *H04L 9/32* | (2006.01) | |
| *H04L 9/40* | (2022.01) | |
| *H04L 67/1097* | (2022.01) | |

(52) U.S. Cl.
CPC ........ *G06F 21/6218* (2013.01); *H04L 9/0819* (2013.01); *H04L 9/0861* (2013.01); *H04L 9/14* (2013.01); *H04L 9/3226* (2013.01); *H04L 63/0428* (2013.01); *H04L 63/08* (2013.01); *G06F 2221/2107* (2013.01); *H04L 67/1097* (2013.01)

(58) Field of Classification Search
CPC ...... G06F 21/6218; G06F 3/067; G06F 3/064; G06F 21/602; G06F 21/6227; G06F 16/1748
See application file for complete search history.

(56) References Cited

U.S. PATENT DOCUMENTS

| | | |
|---|---|---|
| 9,405,926 B2 | 8/2016 | Lewis |
| 10,043,017 B2 | 8/2018 | Lewis |
| 11,636,217 B2 | 4/2023 | Lewis |
| 12,400,076 B2 * | 8/2025 | Carrier ................ G06F 40/284 |
| 2003/0084020 A1 * | 5/2003 | Shu ..................... H04L 1/0041 |
| 2003/0220985 A1 * | 11/2003 | Kawamoto .......... G06F 3/0643 |
| | | 709/219 |
| 2004/0153952 A1 | 8/2004 | Sharma et al. |
| 2005/0044561 A1 | 2/2005 | McDonald |
| 2005/0125236 A1 | 6/2005 | Agapi et al. |
| 2008/0183975 A1 | 7/2008 | Foster et al. |
| 2008/0256143 A1 * | 10/2008 | Reddy .................. G06F 16/174 |
| 2009/0049260 A1 | 2/2009 | Upadhyayula |
| 2009/0300719 A1 | 12/2009 | Ferris |
| 2010/0031086 A1 | 2/2010 | Leppard |
| 2010/0146375 A1 | 6/2010 | Katz et al. |
| 2010/0235887 A1 | 9/2010 | Burch et al. |
| 2010/0299313 A1 * | 11/2010 | Orsini .................. G06F 21/602 |
| | | 707/652 |
| 2011/0107103 A1 | 5/2011 | Dehaan et al. |
| 2012/0110346 A1 | 5/2012 | Resch |
| 2012/0278622 A1 | 11/2012 | Lesavich et al. |
| 2012/0311346 A1 * | 12/2012 | Resch ..................... G06F 11/10 |
| | | 713/189 |
| 2014/0331065 A1 * | 11/2014 | Resch .................. G06F 3/0644 |
| | | 713/193 |
| 2016/0321461 A1 * | 11/2016 | Oliver ................. G06F 21/6209 |
| 2016/0344546 A1 * | 11/2016 | Resch ................ G06F 21/6218 |
| 2017/0053132 A1 * | 2/2017 | Resch ...................... G06F 8/65 |
| 2018/0013680 A1 * | 1/2018 | Bull ................. H04W 72/1268 |
| 2018/0204192 A1 | 7/2018 | Whaley et al. |
| 2021/0286884 A1 * | 9/2021 | Lewis ..................... G06F 3/062 |

OTHER PUBLICATIONS

International Preliminary Report on Patentability issued on Feb. 5, 2019 for International Application No. PCT/US2017/045149, pp. 5.
International Search Report and Written Opinion issued on Dec. 7, 2017 for International Application No. PCT/US2017/045149, pp. 6.
Extended European Search Report issued on May 3, 2018 for EP 15814481.6 International Application No. PCT/US2015/038433, pp. 6.
Supplementary European Search Report issued on Apr. 23, 2018 for EP 15814481.6 International Application No. PCT/US2015/038433, pp. 2.
International Preliminary Report on Patentability issued on Jan. 3, 2017 for International Application No. PCT/US2015/038433, pp. 5.
International Search Report and Written Opinion issued on Mar. 10, 2020, for International Application No. PCT/US2020/015664, pp. 6.

* cited by examiner

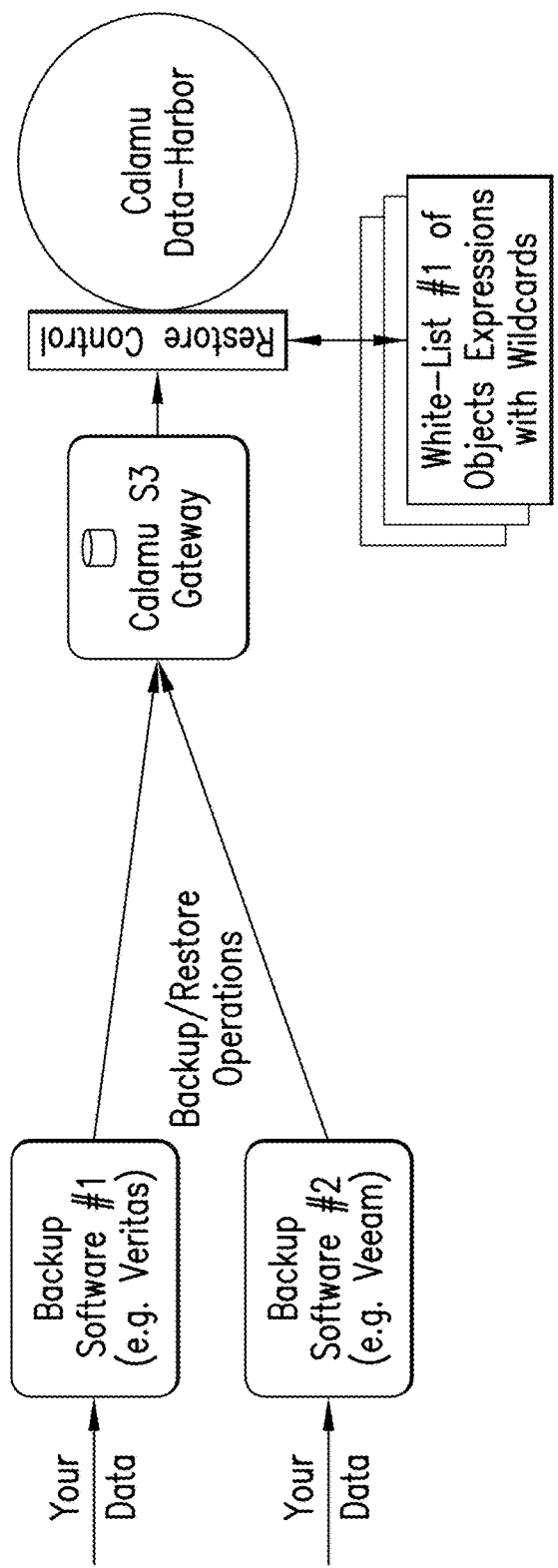

FIG.14A

Solution — Restore Control (1 of 2)

- Data analysis: analyze the 'reads pattern' each backup software generates during backups (not restores). These usually include specific filenames or directory names or structure and do NOT include the actual data of the files that are being backed-up. Create a 'white-list' of the read patterns using regex expressions.
- Deploy these white lists at the Calamu Data Harbor backend platform to be used in MFA/Restore-Controlled vaults.
- Usually, for an MFA protected vault, there is an MFA process for every reconstitute (read) operation.
- With Restore Control, when a reconstitute operation is requested from an MFA/Restore=Controlled vault, the source is examined and based on the request 'user-agent', it is determined if this is requested by a specific backup software.
- If it is not identified as a backup software request, the reconstitution request has to go through an MFA process as usual.

SYSTEMS AND METHODS FOR BREACH-PROOF, RESILIENT, COMPLIANT DATA IN A MULTI-VENDOR CLOUD ENVIRONMENT AND AUTOMATICALLY SELF HEALS IN THE EVENT OF A RANSOMWARE ATTACK

CLAIM OF PRIORITY

This application is a Continuation In Part of U.S. patent application Ser. No. 18/124,009 filed on Mar. 21, 2023, which is a continuation of Ser. No. 17/211,919 filed on Mar. 25, 2021, which is a Continuation In Part of U.S. patent application Ser. No. 16/261,720 filed on Jan. 30, 2019, now U.S. Pat. No. 10,984,116, which is a Continuation In Part of U.S. patent application Ser. No. 16/055,587 filed Aug. 6, 2018, now abandoned, which is a Continuation of U.S. patent application Ser. No. 15/226,237 filed Aug. 2, 2016, now U.S. Pat. No. 10,043,017, which is a Continuation In Part of U.S. patent application Ser. No. 14/251,612 filed Jun. 30, 2014, now U.S. Pat. No. 9,405,926, which claims priority from U.S. Patent Application No. 61/812,115 filed Apr. 15, 2013, all of which are incorporated herein by reference in their entireties.

FIELD OF THE INVENTION

This invention relates to digital data storage, protection, and security in a cloud-based environment.

BACKGROUND

With the advent of the internet, cyber security and data privacy is a growing global concern in today's world. Information technology and electronic discovery advances in a variety of industries, including the legal industry have compounded the issue. The United States and many foreign countries have enacted strict and stringent requirements on data privacy and security. Global entities and multinational corporations have struggled to comply with local data privacy laws. Data privacy laws define how companies and individuals must store and manage computer data. However, the laws are complex and sometimes the laws of one jurisdiction are in direct conflict with the laws of another jurisdiction. This has caused companies to give much thought as to how and where it stores their protected data. Because of the evolution of technology, companies are migrating away from managing and storing data internally, and opting instead to store data with a third party. The third party provider provides the physical infrastructure and maintains the data for a large number of customers. This scenario is generally known as the "cloud" or a virtual storage system. Such cloud-based systems are used by many companies, but each is maintained by a single cloud service provider or "cloud vendor".

The development of the cloud has introduced many new challenges for companies. Customers are unclear as to what jurisdiction contains their inactive digital data (i.e. data at rest), since a cloud customer does not know where a cloud vendor maintains its actual physical infrastructure. Other challenges involve data security. Cloud environments can be compromised by hackers or by a company's internal employees ultimately leading to an organization's data being accessed or transferred. If the data is sensitive, such as personally identifiable information ("PII"), the company may be required to make a mandatory disclosure to its customers. In some cases, the company is not aware of such an invasion, and thereby may not make the disclosure they are required to make. Organizations are also confronted with protecting data from a ransomware attack. If a ransomware attack occurs, data may be encrypted, exfiltrated, destroyed, and/or modified. In addition, a cloud vendor may go offline or go out of business, thereby creating a potential situation where a subscriber cannot access its own data. The present invention solves many of these and other challenges.

The present invention relates to a cloud-based system including the creation of a system which causes computer data to be redundant and jurisdiction independent. In the present application, a data file is segmented and encrypted wherein each data file segment is striped across multiple cloud service providers. Thus, in the event each cloud service provider maintains physical storage in a different jurisdiction, then each encrypted segment will be at rest in a different jurisdiction. Therefore, each encrypted segment contains no readable data on its own, and must be reassembled with its other segments before the whole can be decrypted. Only once the segments from different physical locations are assembled can it be decrypted and read. The disclosed system enables a data file to be jurisdictionally independent until it is reassembled, and once the data is reassembled will it be able to be governed. The present application enables a company to subscribe to many cloud vendors, and not have to worry about their data at rest. For example, during the legal discovery process, a company can choose the jurisdiction for data production simply by reassembling its data in that jurisdiction.

SUMMARY

A cloud-based system for securely storing data, the system having a processor which obtains a source data file; splits it into at least three fragments; and uses an encryption key associated with the fragments to encrypt the fragments and distributes the encrypted fragments among at least three cloud storage providers, and creates a pointer file containing information for retrieving the encrypted fragments. When a system user requests access to the data, the system uses the information stored in the pointer file to retrieve the stored encrypted fragments from the plurality of clouds; decrypts the fragments and reconstructs the data, and provides data access to the system user. This system makes data virtually immune to a data breach. The data is also protected from a ransomware attack either in a cloud or locally. If a ransomware attack were to occur, the data is automatically self healed.

BRIEF DESCRIPTION OF THE DRAWINGS

FIGS. 14A and 14B illustrate an improved solution for the problem illustrated in FIG. 12.

DETAILED DESCRIPTION

Figure 1:
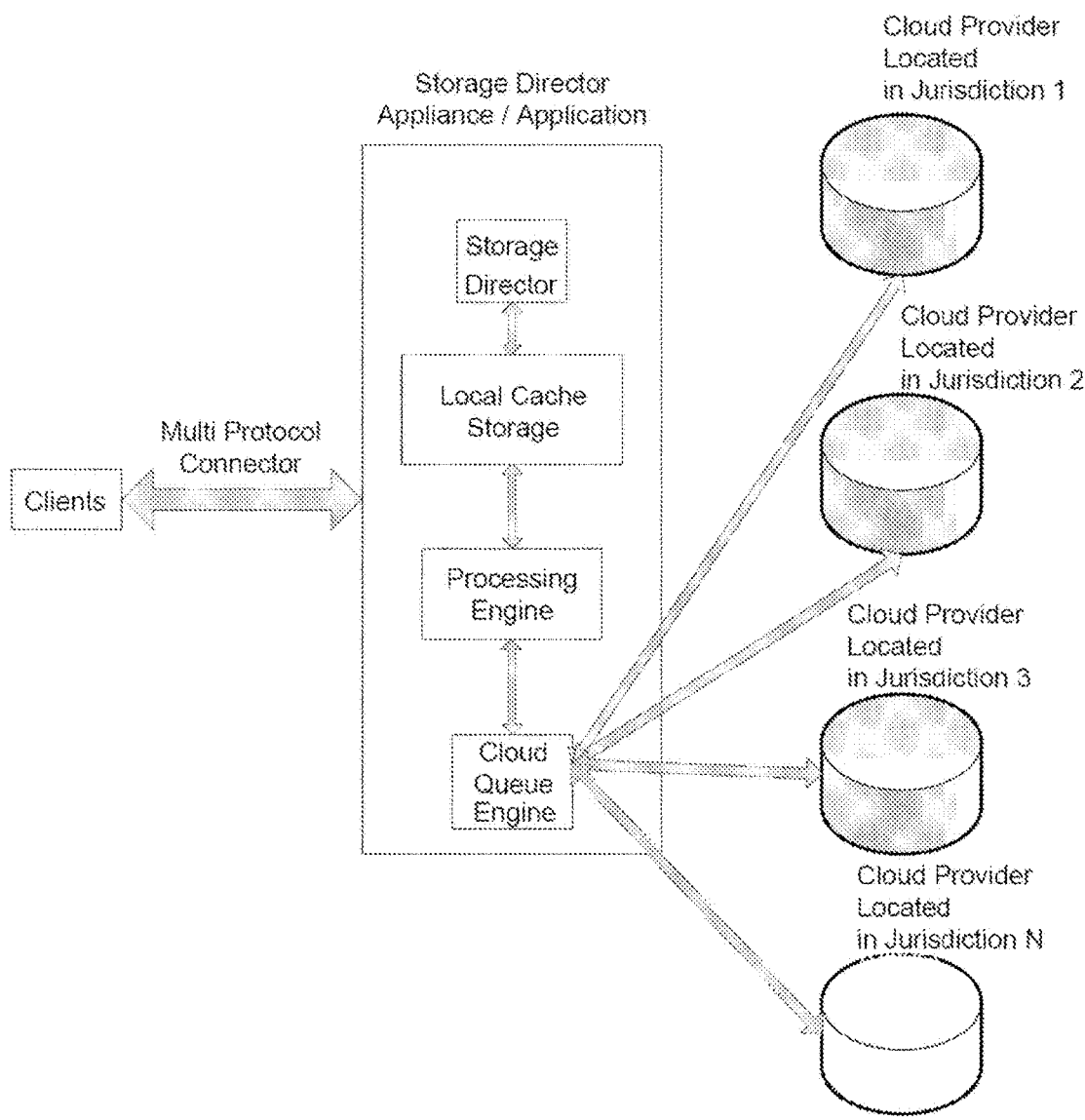
FIG. 1 shows a preferred system of the invention.

Embodiments of the present invention will now be described with reference to the drawings. Identical elements in the various figures are identified with the same reference numerals. Exemplary embodiments and aspects of the present invention are described by way of explanation of the present invention, which is not intended to be limited thereto. In fact, those of ordinary skill in the art may appreciate upon reading the present specification and viewing the present drawings that various modifications and variations can be made thereto.

FIG. 1 shows the process flow of data through the cloud-based system of the present application. The process commences with a native data file, the data file is encrypted and broken into segmented parts, and the segmented data file is then forwarded to multiple cloud storage providers located in multiple physical locations. A client (or multiple clients) connects to a Storage Director Appliance or Software Application through a Multi-Protocol Connector. The multi-protocol connector may be accessed via a web browser through the Internet. The Storage Director Appliance or Application has the ability to locally store a cached file in local cache storage. The file is processed by a processing engine where it is encrypted and separated into "n" parts. Each of the parts is passed on to the Cloud Queue Engine, which transmits and deposits the segmented parts to multiple Cloud Providers located in multiple physical locations. When the file is requested by an authorized user, the Cloud Queue Engine retrieves a copy of each of "n" parts, downloads them to the Storage Director Appliance or Application, and processes the Segmented parts to re-create the original encrypted file. The encrypted file is decrypted, and the native file becomes available to the user.

Figure 2:
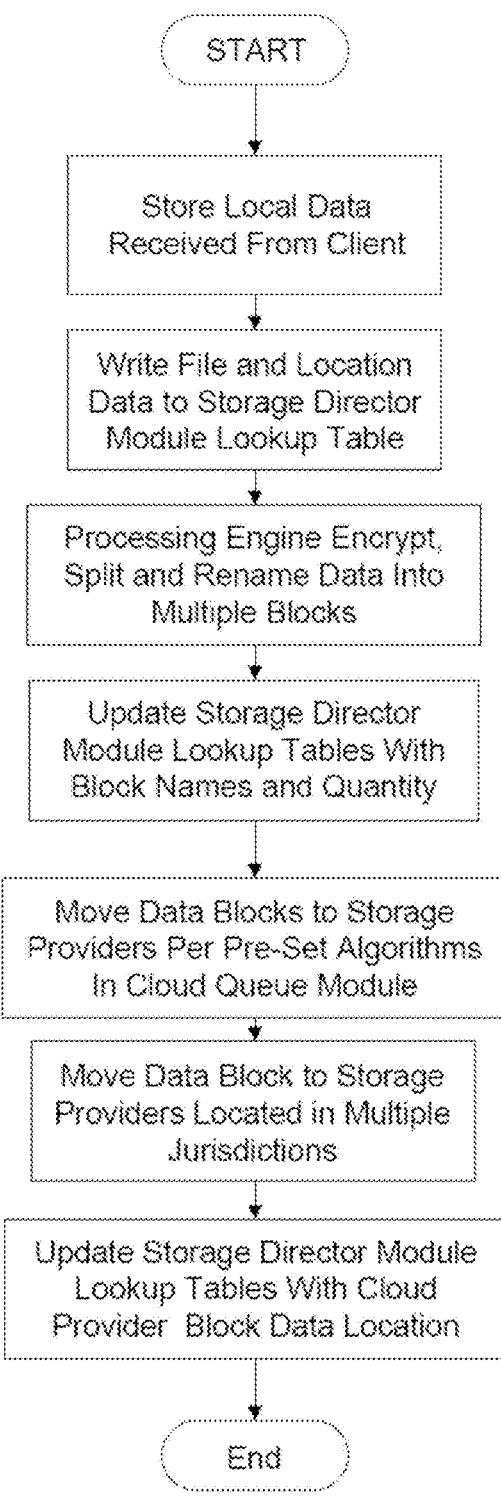
FIG. 2 shows a preferred method of the invention.

FIG. 2 shows a flow chart diagram that describes the process of taking a native file and securely storing it in multiple cloud vendors located in more than one jurisdiction. To reassemble the file, the process is simply reversed. In step 1, local or native data is received from a Client and ready for processing. In step 2, the file and location data are written to the Storage Director module Lookup Table. In step 3, the file is processed by the Processing Engine, where it is encrypted. The encrypted file is then broken into multiple data blocks, and each block is assigned a unique name or identifier. In step 4, the Storage Director module Lookup table is updated with the block name of each data block and the total Quantity of blocks that were created from the original encrypted file. In steps 5 the data blocks are Forwarded and moved to storage providers as per a preset algorithm as instructed by the Cloud Queue Engine or Module. In step 6, the blocks are forward and moved to one of multiple cloud storage providers which are located in multiple physical locations as instructed by the Cloud Queue Engine or Module. The blocks are stored at cloud providers located in different physical locations. In step 7, the Storage Director module lookup table is updated with the data location of each block at each Cloud Provider.

Figure 3:
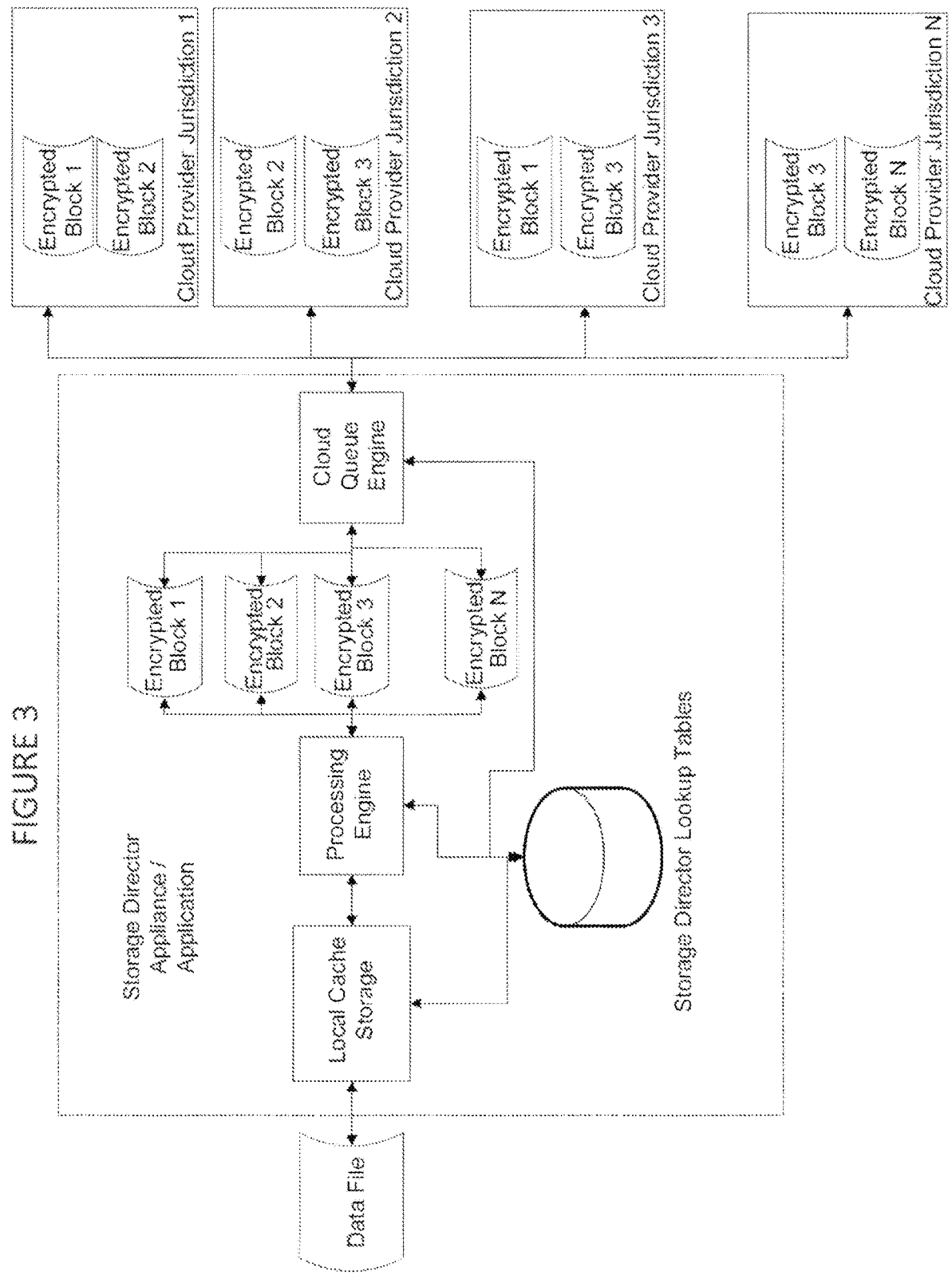
FIG. 3 shows a graphical representation of the flow of a data file and data blocks in the system.

In FIG. 3, a graphical representation of the data flow is shown. FIG. 3 also illustrates how data blocks are securely and redundantly stored across Cloud Providers in "n" physical locations. Once a native data file is encrypted and broken into data blocks by the Storage Director Appliance or Application, the Cloud Queue Engine or module distributes the blocks to "n" Cloud Providers in "n" physical locations. Each data block is written to two or more Cloud Providers, which "stripes" the data across multiple providers in varying physical locations. If a given Cloud Provider is compromised by going offline and unavailable, the Cloud Queue Engine can still retrieve the data blocks from another Cloud Provider. In addition, if a given Cloud Provider is compromised by a hacker or unauthorized user, the data blocks that may have been compromised are of no value to the hacker, because the hacker will only be in possession of encrypted blocks, and not any entire file.

The present embodiments relate to systems and methods for secure data storage in a multi-vendor cloud environment in a manner that prevents the third party cloud provider from being able to access or be in possession of complete data files. The computer or device that creates the source data distributes only a portion of a data file to each of a plurality of cloud storage providers. The source computer or device maintains a lookup table and is able to re-assemble the data. Each storage provider only maintains part of each data file, and therefore is never in possession of any complete data file(s). The source computer or device can retrieve each portion of the file from multiple cloud providers, whereby the portions are re-assembled into the complete data file by using the lookup table. The system allows for large amounts of data to be stored across a plurality of third party cloud storage providers in a manner that prevents any third party from having access to any complete file. The data is distributed globally among a plurality of cloud storage providers. No single cloud provider has access to any complete file, as each file is broken into Encrypted segments or data blocks and only one Data block is sent to each cloud provider. Each cloud provider is in a different physical location across multiple physical locations. As a result, the file does not exist at rest in any one jurisdiction, thus is not subject to legal and/or regulatory requirements of any single jurisdiction while it is stored in a multi-vendor cloud environment.

The system ensures that any data file stored in a multi-vendor cloud environment in this manner cannot be subject to the laws governing production of, privacy of, or protection of data in any jurisdiction.

In another embodiment, a system and method for securely sharing data files by using a multi-vendor cloud environment in a manner that prevents any third party from being able to access or be in possession of the original source data file is taught. The computer or device that creates the source data splits each file into multiple segments. Each segment is then encrypted using an encryption key defined by the user. Each of the encrypted fragments are then distributed to multiple cloud properties whereby only a portion of the fragments of the source data file is stored to any one of a plurality of cloud storage providers. The source computer or device maintains a pointer file that contains a lookup table and is able to re-assemble the data if it knows the encryption key and has access to the same cloud properties. Each storage provider only maintains part of each data file, and therefore is never in possession of any complete data file(s). Any computer or device that has possession of the pointer file, knows the encryption key, and has access to the cloud provider storage can retrieve each portion of the file from multiple cloud providers, whereby the portions are downloaded, decrypted using the user generated encryption key stored in the pointer file, and re-assembled into the complete data file by using the lookup table. The system allows for large amounts of data to be stored across a plurality of third party cloud storage providers in a manner that prevents any third party from having access to any complete file. The data is safe from being exploited or hacked by any third party, since even if all cloud providers are breached, the data cannot be re-assembled without the encryption key and the lookup table.

In this embodiment, the method comprises; a source data file is created, the source data file is split into fragments; an encryption key is created by the user; each fragment is encrypted using the encryption key; the fragments are distributed in multiple cloud storage providers, whereby no single cloud storage provider is in possession of all fragments; a pointer file is created that stores the location of each fragment; the pointer file is stored locally, and the original file is deleted. The user is able to open the pointer file, enter the encryption key, and authenticate to the cloud storage providers. Each fragmented is transferred from the cloud storage providers to the local computer. The fragments are re-assembled locally on the computer.

In another embodiment, a system and method for securely sharing data files by using a multi-vendor cloud environment in a manner that prevents any third party from being able to access or be in possession of the original source data file is taught. The computer or device that creates the source data splits each file into multiple segments. Each segment is then encrypted using an encryption key defined by the user. Each of the encrypted fragments are then distributed to multiple cloud properties whereby only a portion of the fragments of the source data file is stored to any one of a plurality of cloud storage providers. The source computer or device maintains a pointer file that contains a lookup table and is able to re-assemble the data if it knows the encryption key and has access to the same cloud properties. The pointer file can be freely shared with other users using any data transmission method, including email, copy/paste, etc. Each storage provider only maintains part of each data file, and therefore is never in possession of any complete data file(s). Any computer or device that has possession of the pointer file, knows the encryption key, and has access to the cloud properties can retrieve each portion of the file from multiple cloud providers, whereby the portions are downloaded, decrypted using the user generated encryption key stored in the pointer file, and locally re-assembled into the complete data file. The system allows for large amounts of data to be stored across a plurality of third party cloud storage providers in a manner that prevents any third party from having access to any complete file, unless the source user shares the pointer file, encryption key, and access to the cloud properties. The data at rest is safe from being exploited or hacked by any third party, since even if all cloud providers are breached, the data cannot be re-assembled without the pointer file, encryption key, and access to a complete set of fragments.

In this embodiment, the method comprises: a source data file is created; the source data file is split into fragments; an encryption key is created by user #1; each fragment is encrypted using the encryption key; the fragments are distributed in multiple cloud storage providers, whereby no single cloud storage provider is in possession of all fragments; a pointer file is created that stores the location of each fragment; the pointer file is stored locally, and the original file is deleted. The pointer file is shared with user #2. User #2 is able to access the fragments stored at the cloud storage providers; User #2 has knowledge of the encryption key; User #2 is able to open the pointer file, enter the encryption key, and authenticate to the cloud storage providers. Each fragment is transferred from the cloud storage providers to the local computer of user #2. The fragments are re-assembled locally on the computer of user #2.

The advantages and features of the application are of a representative sample of embodiments only, and are not exhaustive and/or exclusive. They are presented only to assist in understanding and teach the claimed principles. It should be understood that they are not representative of all disclosed embodiments. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments of the system may be implemented that enable a great deal of flexibility and customization.

Figure 4:
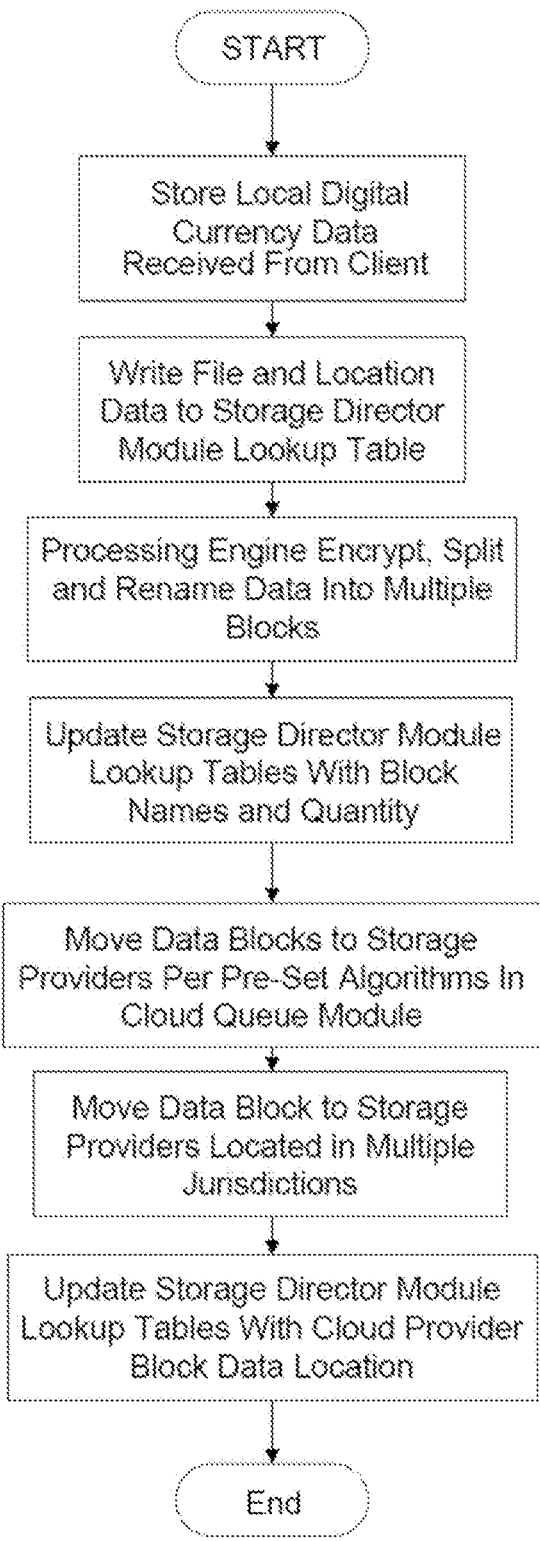
FIG. 4 shows an alternative method of the invention.

In another embodiment, the cloud-based system (as shown in FIG. 4) is configured to securely store digital currency. According to an embodiment, the system is configured such that the digital currency is at rest across publicly available network clouds. According to an embodiment, the system provides data security and has a processor which creates a source digital currency data file. The source data file is split into multiple fragments.

According to an embodiment, the system generates an encryption key associated with the fragments, wherein the one or more fragments are encrypted by the encryption key. According to an embodiment, the system further uses a plurality of cloud storage providers, wherein the one or more fragments are distributed among the plurality of cloud storage providers, whereby no single cloud storage provider possesses all of the fragments According to an embodiment, a pointer file is created on a local computer, wherein the pointer file is configured to store the location of the one or more fragments, and wherein the pointer file is accessed. According to an embodiment, the encryption key authenticates the plurality of cloud storage providers and the one or more fragments are then transferred from the plurality of cloud storage providers to the local computer, wherein the one or more fragments are reassembled. Once reassembled, the source data file is deleted, further increasing the security over the digital currency files.

In embodiments, aspects of the herein disclosed systems and methods may be configured to be self-healing. For example, a file processed via the storage director may be stored in such a way that if one location is infected with ransomware, the file automatically "self-heals" without the need to interact with the bad actor or pay the ransom. The process may also be applied to a database, either in whole or in part, to protect the data at rest. Data may be stored with security, in that the pointer file may be shared in a collaborative manner with others, and the original data can be reconstituted by anyone that has proper security permissions. Finally, an application programming interface (API) may be provided such that functionality of the storage director may be inserted between an application and the storage of that application through the use of the API.

Figure 5A:
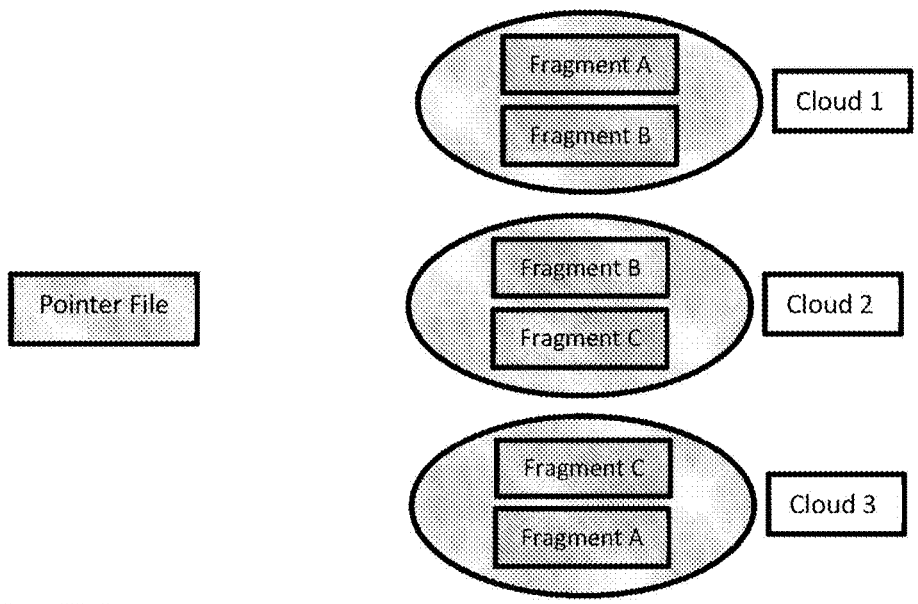
FIGS. 5A and 5B show an embodiment of a system, configured to maintain secure storage of data when a portion of the system becomes unavailable.

As described previously, in embodiments data processed by the storage director is stored in encrypted blocks across multiple cloud locations or data centers, and the original file is deleted and replaced with a pointer file. Each cloud location or data center contains a subset of encrypted file fragments for use in recreating the file. The pointer file contains no user generated content. FIG. 5A shows, in a block diagram simplified for clarity, the final state of such a process. As shown, the original data is broken into at least three encrypted fragments, and stored in three distinct clouds, preferably in three different physical locations. Each cloud contains at least two but fewer than all of the encrypted fragments, so that none of the data can be recovered from the fragments stored only in any one cloud. The pointer file stores the location of each of the fragments stored in each of the clouds. As described previously, if any single cloud, or one or more of the fragments stored therein, become(s) corrupted, the corrupted fragments can be recovered from at least one other cloud.

FIG. 5B illustrates, again in simplified form, embodiments that are self-healing, that is, able to automatically recover from data corruption or other unavailability. For example, if the pointer file becomes corrupt, encrypted, deleted, or the system that hosts the pointer file is lost or stolen, the pointer file can be recreated by the user accessing the system. Access may be provided, for example by logging into a web-portal-access based implementation of the storage director. The user may then request that the pointer file be recreated and stored either on a device previously included in the system, or on a new device. This protects the pointer file from ransomware, malware, data breach, theft, accidental deletion, or the like. In addition, in embodiments if one of the cloud or storage locations becomes unavailable, either through outage, data breach, ransomware attack, misconfiguration, or other cause, the system is able to detect such outage.

Figure 5B:
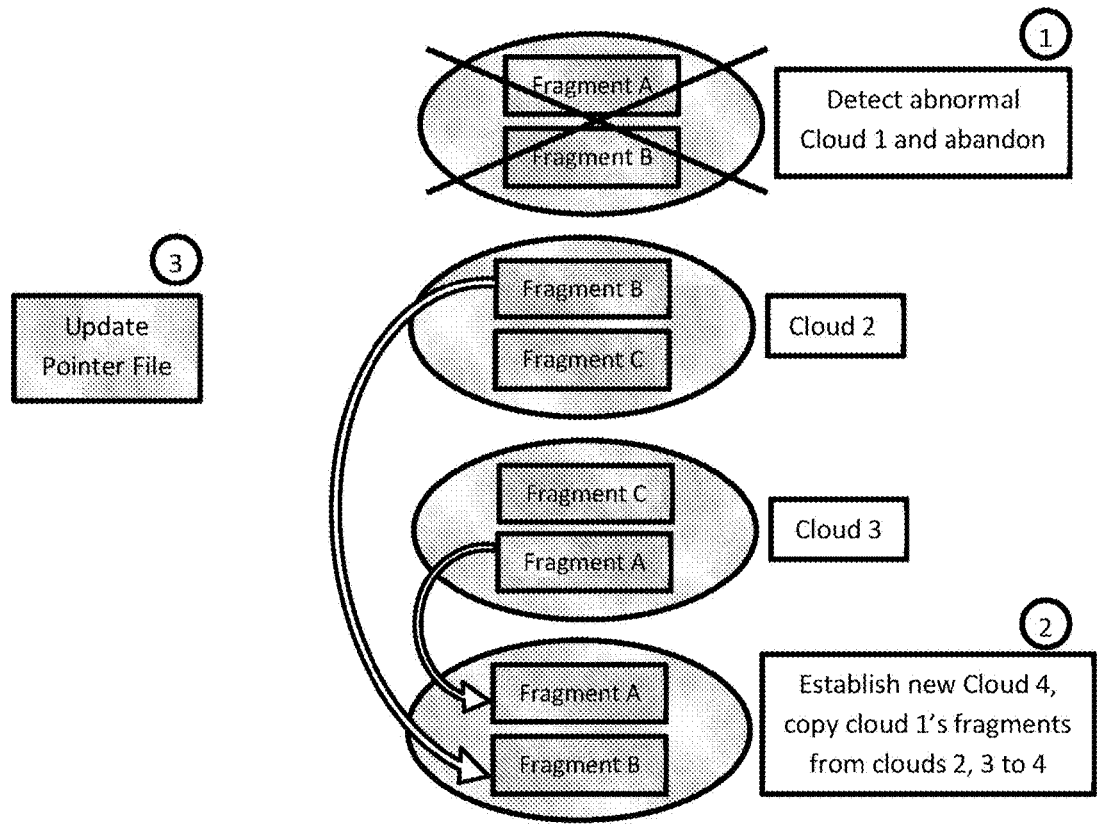

These functions are possible in embodiments in which, at the time the encrypted file fragments are initially created and stored in a plurality of clouds, the storage director system inserts a "control file" into each of the clouds. Thereafter, the storage director system periodically checks the status of the control file by reading its hash value and comparing it to the expected hash value. If the hash value has been altered, or if the file is not found, or if the cloud cannot be reached, the storage director defines this as an abnormal event. In the case of an abnormal event, the storage director abandons the affected cloud, notifies IT of a data incident, and automatically creates or activates a fourth cloud. The fourth cloud is automatically populated with the fragments that existed in the affected cloud by copying them from the remaining unaffected original clouds. The system is updated such that the pointer file will thereafter cause the system to ignore the abnormal cloud and store/retrieve information in the newly created/activated cloud. The result is a data system that is completely self-healing after an abnormal event is encountered. For example, as illustrated in FIG. 5B, in the event of a ransomware attack on Cloud 1, Cloud 1 is abandoned (1), and Cloud 4 is automatically activated (2). The fragments that existed in Cloud 1 are copied from Cloud 2 and Cloud 3 into Cloud 4 (2), and the pointer file is updated (3). This action allows a cloud that has been infected with ransomware (or other abnormality) to be replaced with a new normal cloud and the pointer file updated, thereby "self-healing" the system without paying a ransom and with no downtime.

Several usage cases will now be presented to illustrate more clearly the operation of exemplary self-healing embodiments. For purposes of illustration, a system including the storage director and clouds is referred to as a "platform" that is accessible by a non-platform client computer to store some or all of its data in a breach-proof, resilient, regulation-compliant manner.

In a first illustrative case, the platform processes and stores client data prior to the occurrence of an abnormal event that affects the client. An abnormal event may be or include occurrences such as a local device is lost, unavailable, or fails due to a data breach or attack such as malware or ransomware, or the like.

The data is first processed by the storage director to replace the native files with a Pointer File. The Pointer File does not contain any user generated content. Rather, it simply contains an instruction to the storage director regarding retrieving the encrypted fragments from where they have been stored. Prior to being processed by the storage director, a directory of files stored on a local device such as a local drive of a client computer may appear as follows:

MyDocuments\MyFiles
  File1.doc
  File2.xls
  File3.ppt
  MyDocuments\MyFiles\2020
    Tax Return 2020.pdf
    Annual Budget 2020.pdf After being processed by the storage director, the original files and data are deleted from the client and replaced with Pointer Files that do not contain any user generated content. Prior to the event that would render the client files unavailable, the directory and pointer files on the client may appear as follows:

MyDocuments\MyFiles
   File1.doc.pntr
   File2.xls.pntr
   File3.ppt.pntr
   MyDocuments\MyFiles\2020
     Tax Return 2020.pdf.pntr
     Annual Budget 2020.pdf.pntr Then, if the local storage device becomes unavailable, such as due to failure, attack, or loss, the storage director can automatically recreate, using information stored on the platform, the Pointer Files ("pntr Files") and directory structure that were stored locally on the client.

Returning now to the illustrative scenario, suppose the local computer suffers a ransomware attack. After the attack, the files would be encrypted, and the now useless folder structure may look like this:

MyDocuments\MyFiles
   File1.doc.pntr.crypt
   File2.xls.pntr.crypt
   File3.ppt.pntr.crypt
   MyDocuments\MyFiles\2020
     Tax Return 2020.pdf.pntr.crypt
     Annual Budget 2020.pdf.pntr.crypt In order to rebuild the pointer Files in the proper directory structure, the user performs the following steps:

1. Reformat the client device or purchase a new client device
2. Install the platform access information and credentials on the restored client
3. Log into the platform and select an option to restore the pointer files
4. The platform reads the relevant metadata from a "Platform Manifest"
5. Using the metadata, the platform creates new pointer files and stores them on the client in the proper directory structure.

After this process, the pointer files and directory structure on the client will have been recreated and again appear as follows:

MyDocuments\MyFiles
   File1.doc.pntr
   File2.xls.pntr
   File3.ppt.pntr
   MyDocuments\MyFiles \2020
     Tax Return 2020.pdf.pntr
     Annual Budget 2020.pdf.pntr In a second illustrative case, a platform Cloud or Storage Location becomes unavailable for an extended period, for example due to a natural disaster, or is damaged due to breach or ransomware. The data will have been already processed by the storage director, and each Cloud or Storage Location will have been populated with subsets of encrypted fragments as described previously. The platform is able to automatically recognize an abnormal event in the effected cloud or storage location ("cloud") that left it in an abnormal state, abandon the abnormal cloud, create or activate ("create") a new normal cloud, and populate the new cloud with copies of the same encrypted fragments that had been stored in the abnormal cloud, retrieved from the other clouds on which the encrypted fragments had also been stored. This results in a new cloud that contains all of the encrypted fragments that existed in the cloud that was attacked and abandoned. In particular, the platform performs the following:

1. The platform periodically assesses the health of a known control file placed in each respective cloud or storage location ("cloud").
2. The platform detects that the control file on one of the clouds has been modified (deleted, modified, or encrypted), and deems that cloud to be abnormal.
3. The platform automatically abandons the abnormal cloud and alerts the IT department
4. The platform automatically creates or activates ("creates") a new normal cloud
5. The platform retrieves from the healthy clouds copies of the encrypted fragments that had been stored in the abnormal cloud, and stores them in the new normal cloud.
6. The new normal cloud replaces the abnormal cloud in the platform, the pointer file(s) are updated, and the system returns to a normal state.

Figure 6A:
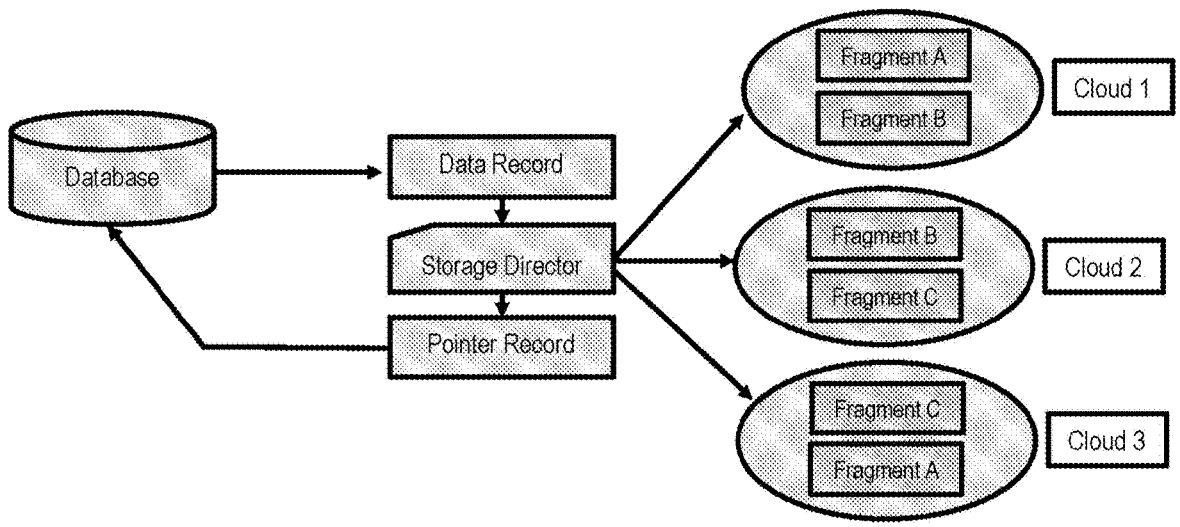
FIGS. 6A and 6B show a system embodiment for use in a transactional environment.

In a third illustrative case, Transactional Data or the like, stored as records in a database, is protected by the platform, by the platform applying its processing to the database, in whole or in part. FIG. 6A illustrates this process in a simplified block diagram. Platform processing is initially applied to some or all of the database. Thereafter, processing is applied in real time while the database is in use, for example when a record is written to the database. Such a record may be one, for example, that contains information of a new transaction. However, instead of storing the new record directly in the database, the record is redirected to be processed by the platform. The platform processes the record into encrypted fragments, and the fragments are written to a plurality of clouds. The data record is then purged from the database and replaced with a Pointer Record, in accordance with previously described processing.

Referring now to FIG. 6A, when a record is generated that ordinarily would be stored only in the database, that record is additionally or alternatively delivered to the storage director. The storage director processes the record into encrypted fragments and stores them in at least three clouds, in the manner previously described. The storage director then generates a pointer record which may be stored in the platform, and may additionally or alternatively be provided to the database where it replaces the original data record, for example by storing the pointer record in a table of the database, and deleting the original data record.

Figure 6B:
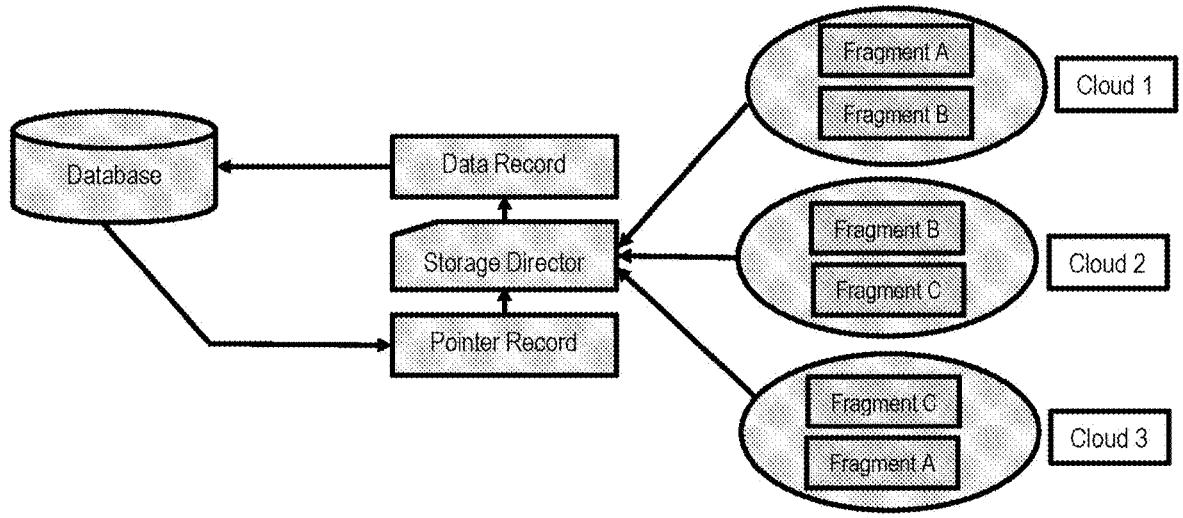

Thereafter as illustrated in FIG. 6B, when the database is queried for a record, such as when an application makes a call for the record, the database accesses the Pointer Record, and conveys the Pointer Record information to the platform to retrieve the encrypted fragments at the locations indicated therein, and reconstruct the Data Record. The reconstructed Data Record is then forwarded to the database.

A fourth illustrative case provides Shared Data with Security. Here, a "pointer file" that has been generated by the platform as previously described may be shared in a collaborative manner with others, and the original data can be reconstituted by other individuals that have proper security permissions and/or credentials.

In general, when a file is processed by the platform, the original file is deleted and is functionally replaced with a pointer file generated by the platform, that does not contain any of the original file's contents. The pointer file may thereafter be shared instead of the original file, using conventional methods in which the pointer file is transferred to another person or system. The contents of the original file remain stored in a plurality of clouds as encrypted fragments, and is not itself shared or transferred.

Figure 7:
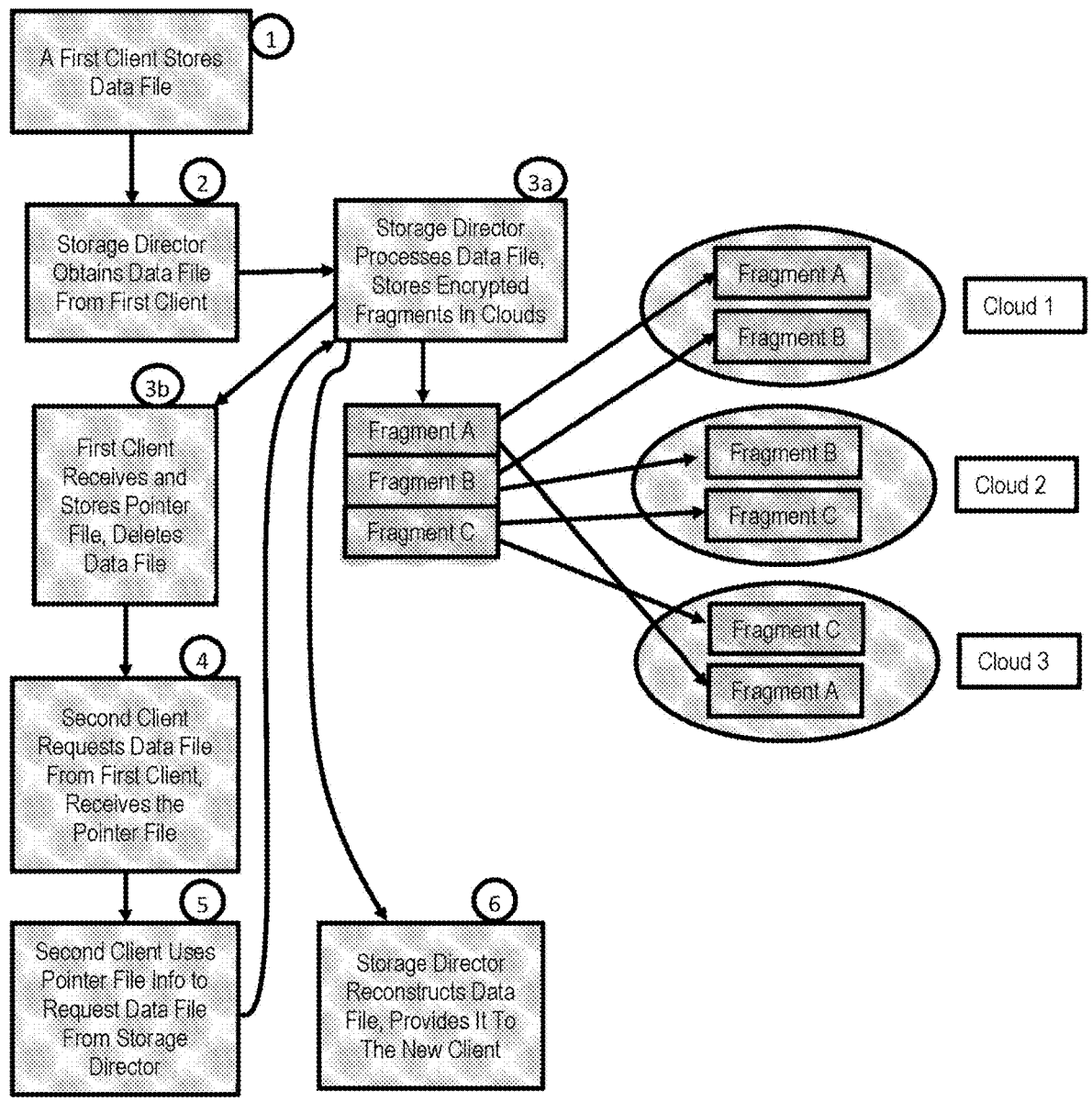
FIG. 7 shows a system that is able to securely share stored data.

FIG. 7 is a simplified block diagram illustrating this process. A First Client Stores, or acts to store, a Data File, 1. The Storage Director Obtains the Data File From First Client, 2. The Storage Director Processes the Data File into encrypted fragments, and Stores the Encrypted Fragments In a plurality of Clouds as previously described, 3a. The storage director returns to the first client a pointer file indicating the locations of the stored fragments, 3b. Thereafter, a second client requests the data file from the first client, and receives from the first client a copy of the pointer file, 4. The second client uses the pointer file information to request the data file from Storage Director, 5. The Storage Director uses the pointer file information to retrieve the encrypted fragments, uses the fragments to reconstruct the Data File, and provides the reconstructed data file to the new client, 6.

A fifth illustrative case provides an Application Programming Interface (API) for use by applications running on clients. The platform can be arranged to sit between virtually any application and the client storage device that ordinarily would store the data used or generated by the application. The application behaves normally, and the user experience when interacting with the application does not change. However, instead of application data being stored in the client storage device, the data is processed and stored in the platform, and the pointer file generated by the platform with information for use in reconstructing the data is stored in the client storage device, as previously described.

Figure 8A:
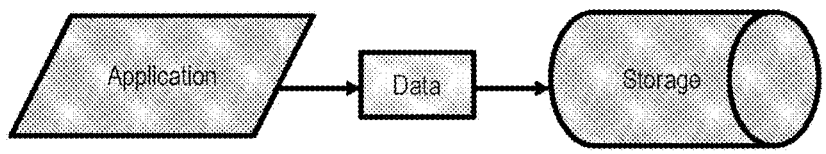
FIGS. 8A and 8B show the use of an API to access the system.

FIG. 8A is a simplified block diagram illustrating an application writing data to a storage location without the use of the herein disclosed platform or its technology. Without the platform, the application acquires or generates data that it stores in a client storage device, which may be local or remote. The stored data is then available for use by the application if needed.

Figure 8B:
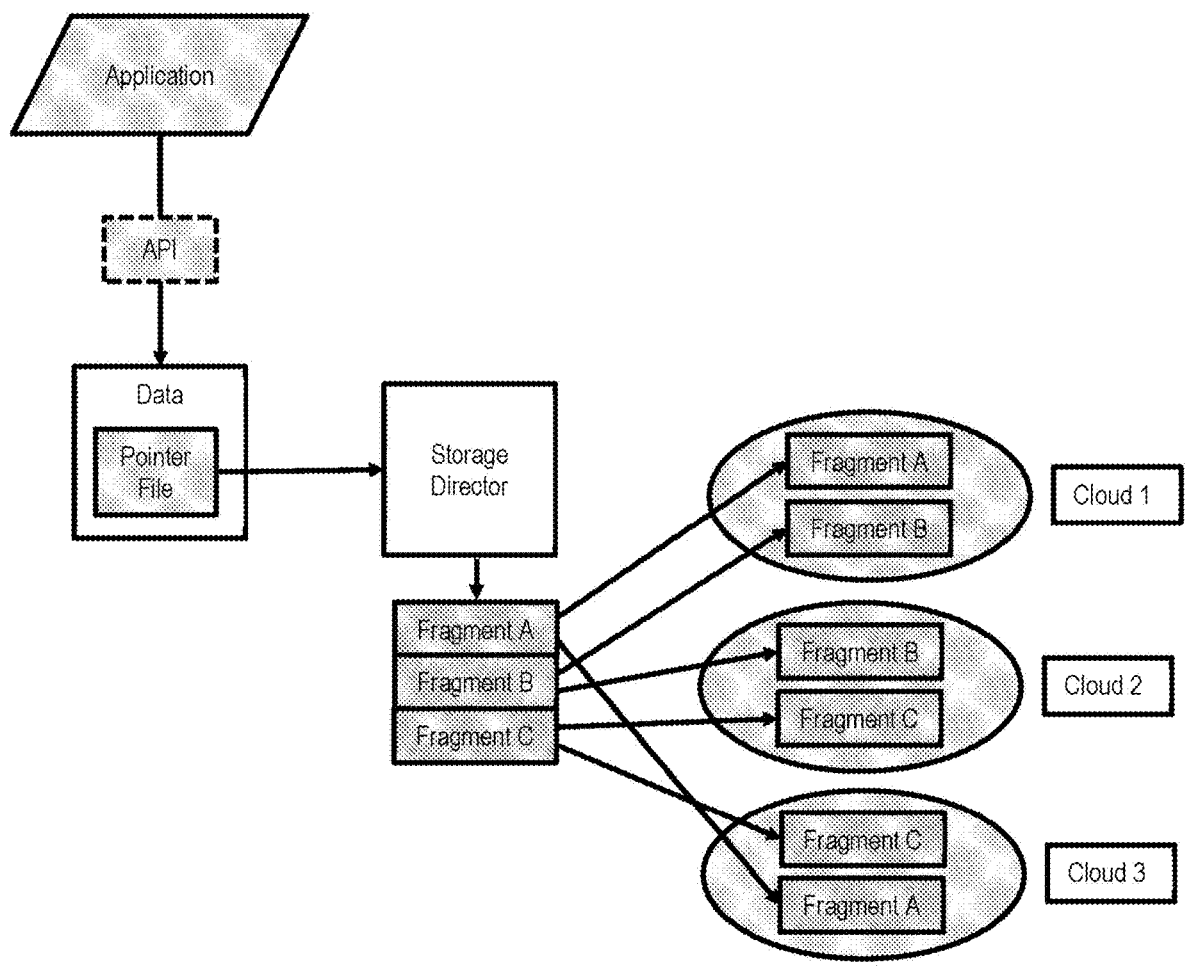

In contrast, FIG. 8B is a simplified block diagram illustrating an analogous case in which the herein disclosed platform is effectively inserted between the application and the storage device to securely store the application data. As shown, when the platform is introduced between the Application and the storage device ordinarily accessed by the application, the data is first processed into a plurality of encrypted data fragments and distributed to multiple clouds or storage locations, and a pointer file is stored on the client, in accordance with the foregoing disclosure.

Thereafter, the application acts normally to request access to the data that ordinarily would be stored in a storage device of the client. The client processes the data request by providing to the platform data storage information obtained from the pointer file. The platform reconstitutes the data and returns it to the client, which provides the data to the application.

Alternatively, as shown in a dashed box, an API may be made available for use by the application to access the data stored in the platform. The API may be provided by the platform to the client for use by the application, or the API may be made available to the application's developer to incorporate the API into the application. In these configurations, the application uses the API to access the pointer file and store and retrieve data on the platform, instead of storing and retrieving data directly to and from the client storage device.

Figure 9:
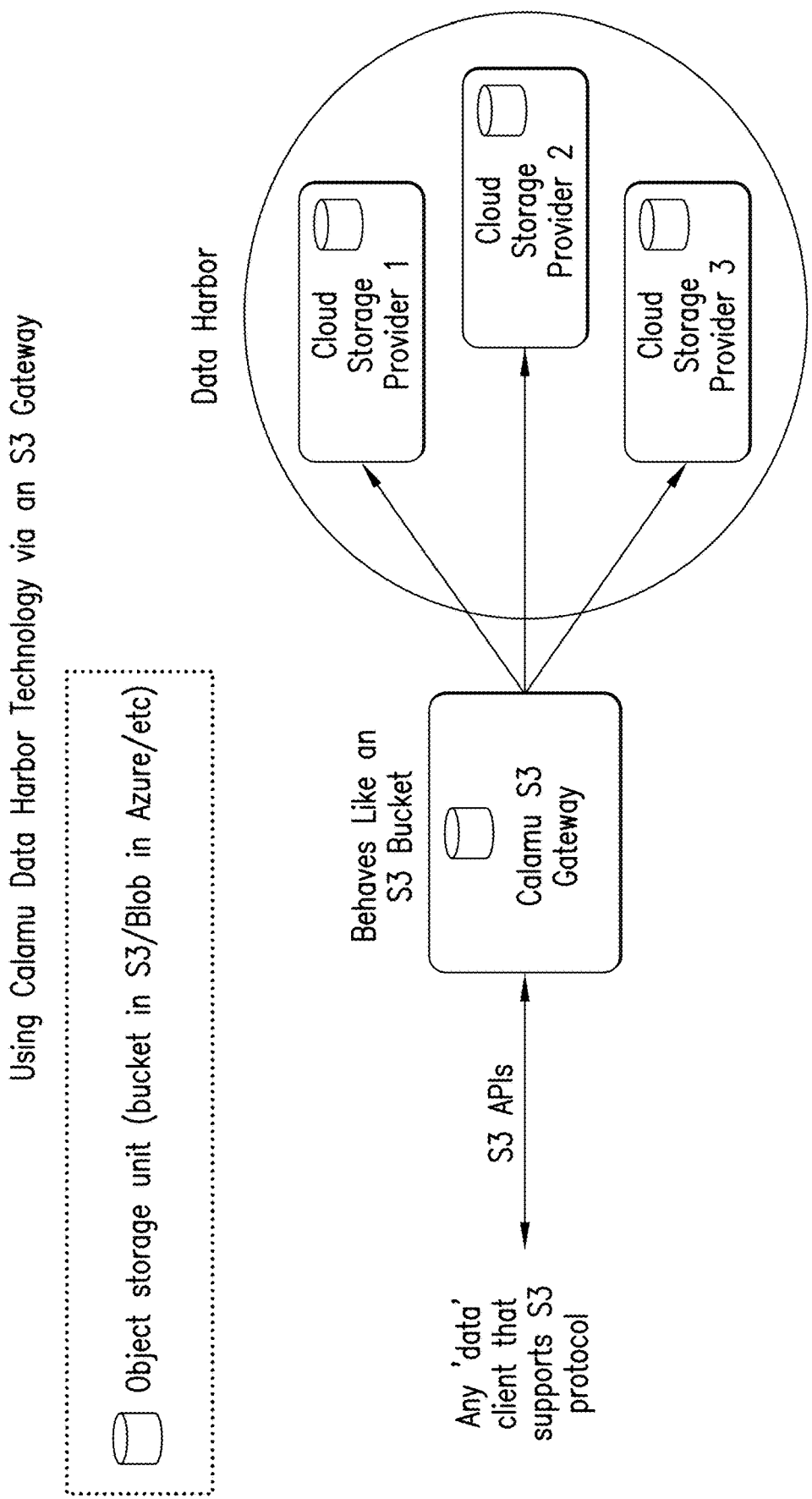
FIG. 9 illustrates a system comprising a data harbor in accordance with the disclosure.

FIG. 9 illustrates a network arrangement in which the plurality of data objects stored in the clouds of a plurality of storage providers are managed at a single gateway. In this case, the storage unit objects being managed may be, for example, so-called data buckets in an Amazon Simple Storage Service (S3) cloud, or blobs in an Azure cloud by Microsoft, or the like. Used in this example, S3 is a service offered by Amazon Web Services (AWS) that provides data object storage through a web service interface. Amazon S3 can store any type of data object, which allows uses like storage for Internet applications, backups, disaster recovery, data archives, and the like. Offerings by other vendors like Azure from Microsoft may have similar capabilities.

As shown in FIG. 9, which uses Amazon S3 to illustrate, a user may use any "data client" that supports the S3 protocol, and that uses S3 APIs. The data object is encrypted and broken into segmented parts, and the parts are then forwarded to multiple data buckets amongst one or more cloud storage providers located in multiple physical locations. A data client connects to an S3 Gateway, which may be configured with or be operatively coupled to a Storage Director (which may be an Appliance or Software Application). In the figure, the S3Gateway/Storage Director is labeled as a Calamu S3 Gateway. This S3 Gateway may be accessed via a web browser through the Internet, for example. The data object is processed by a processing engine where it is encrypted and separated into "n" parts. Each of the parts is transmitted by the S3 gateway, which deposits the segmented parts to multiple Clouds located in multiple physical locations. As shown, the multiple clouds may be collectively referred to as a so-called Data Harbor. When a file is requested by an authorized user, an engine of the S3 Gateway retrieves a copy of each of the "n" parts, downloads them to the Storage Director, and processes the segmented parts to re-create the original encrypted file. The encrypted file is decrypted, and the native file becomes available to the user, as before.

Figure 10:
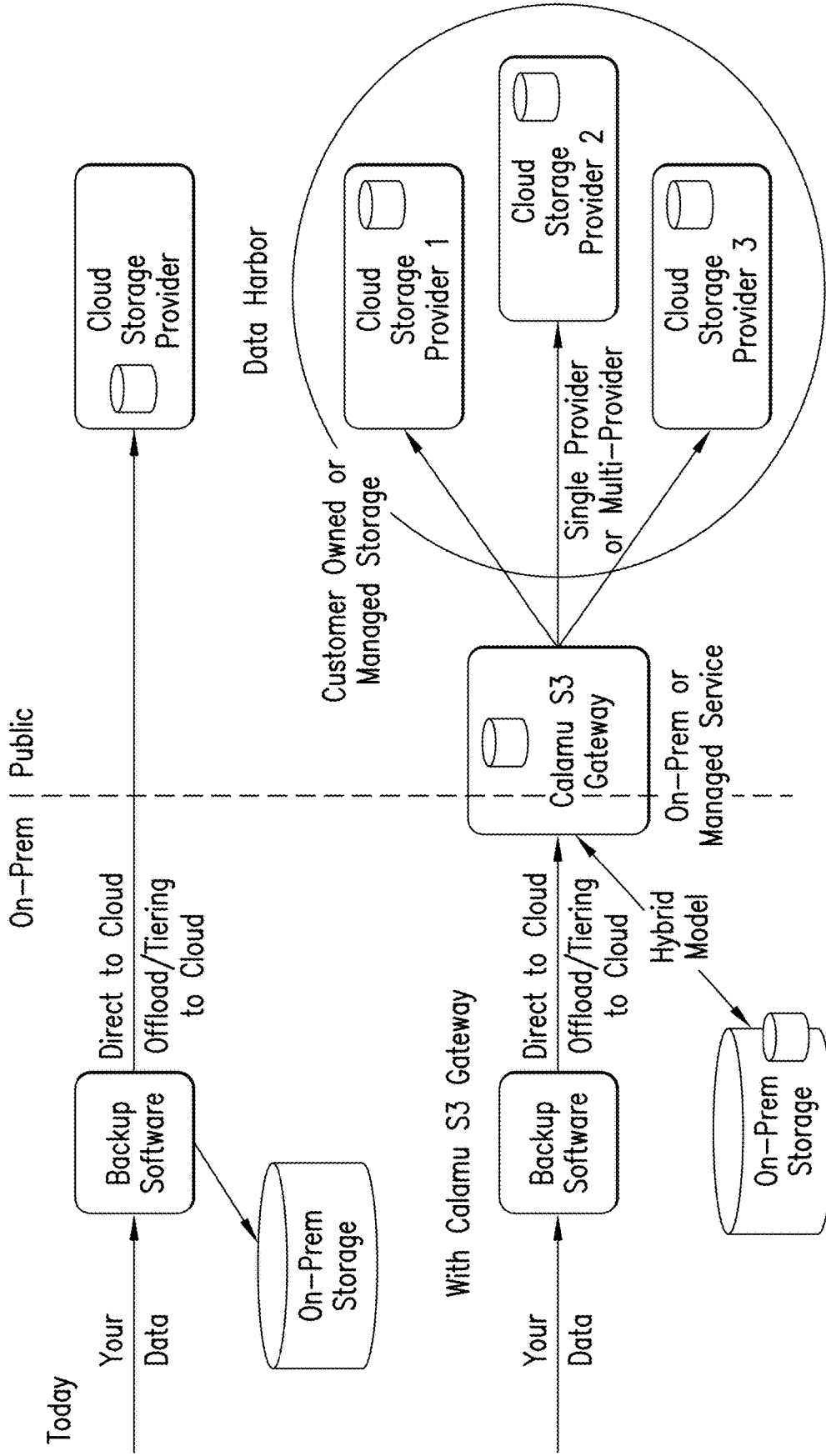
FIG. 10 shows a system providing for direct backups, backup offloading, and backup tiering.

FIG. 10 depicts using the S3 gateway for direct backups, backup offloading, backup tiering, or combinations of these. The figure is divided into quadrants; the vertical dashed line distinguishes private on-premises facilities (left side) from public facilities (right side); the top half of the figure is without the herein disclosed data protection, whereas the bottom of the figure includes the described data protection. In the conventional setup top half of the figure, backup software makes a backup copy of data for on-premises storage. In addition, the data may be stored in a cloud, which may provide for backup offloading, backup tiering, or both. In contrast, an S3 gateway/data director may be provided, which may be configured as or be operatively coupled to a Storage Director. In one aspect, the gateway may produce storage buckets for the user data. In a hybrid model, a copy of the backup data may be stored locally in on-premises storage. In addition, the data objects are processed by a processing engine where each data object is encrypted and separated into "n" parts. Each of the parts is transmitted to the Data Harbor comprising cloud storage providers located in multiple physical locations. As previously described, when a file is requested by an authorized user, an engine of the S3 Gateway retrieves a copy of each of the "n" parts, downloads them to the Storage Director, and processes the parts to re-create the original encrypted file. The encrypted file is decrypted, and the native file becomes available to the user, as before.

Figure 11:
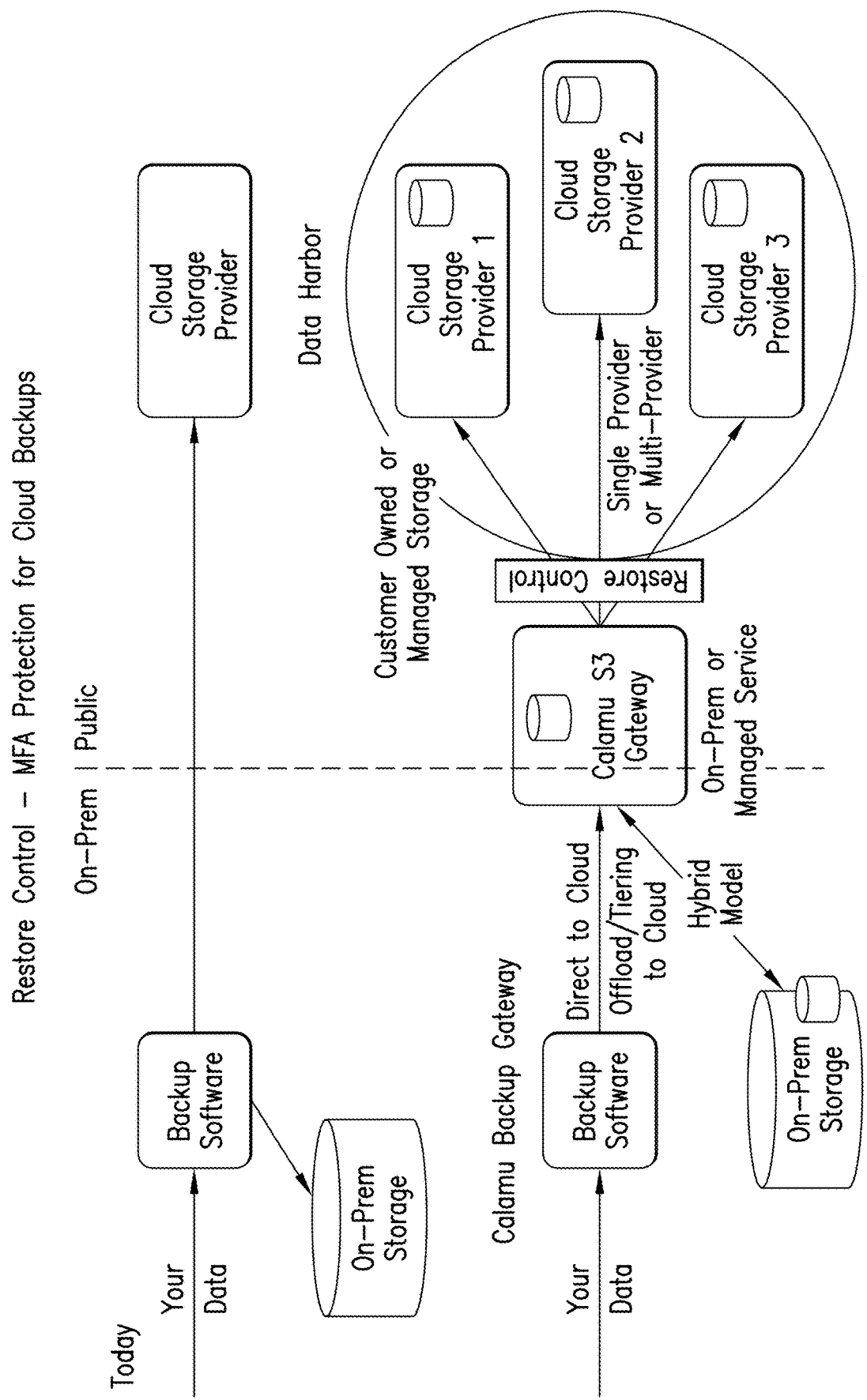
FIG. 11 shows the system of FIG. 10, including Restore Control. Restore Control prevents an unauthorized user from restoring a backup job. This is accomplished by requiring a challenge in the form of two-factor authentication or other permission manually accepted outside of the backup software.

Referring now to FIG. 11, shown is a block diagram of a scenario in which control of data has been lost due to an abnormal event, such as a local device is lost, unavailable, or fails due to a data breach or attack such as malware or ransomware, or the like. Particularly in the case of a malware or ransomware attack, essentially all of the user data is at risk, including data stored both in local on-premises storage, and data stored in the cloud, which may be accessed using information obtained from on-premises storage, for example. Without a clean, current backup, recovering from such an attack may be extremely difficult, and may even be impossible if a ransom is not paid.

FIG. 11 shows how, after the data has been formed into buckets, encrypted, and striped or otherwise stored across multiple clouds in multiple locations, such an attack can be stopped in its tracks and recovered from using systems and methods disclosed herein. As an initial matter, during setup of the disclosed systems and methods the on-premises data is processed by the storage director to replace ones of the native files with a Pointer File. The Pointer File does not contain any user generated content. Rather, it simply contains an instruction to the storage director regarding retrieving the encrypted fragments from where they have been stored. During setup, after being processed by the storage director, the original files and data are optionally deleted from the client and replaced with Pointer Files that do not contain any user generated content. Then, if the local storage device becomes unavailable, such as due to a ransomware attack, the storage director can automatically recreate, using information stored on the platform, the Pointer Files and directory structure that had been stored locally on the client.

Figure 12:
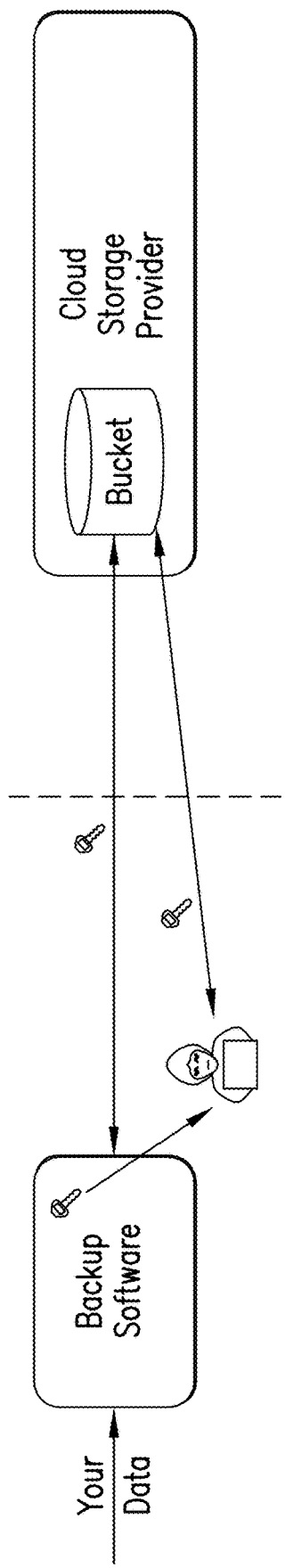
FIG. 12 illustrates a problem of encryption key theft.

FIG. 12 sets forth a scenario in which someone steals the secret/key of the Cloud bucket, with which they can access the storage directly and restore and exfiltrate files. Adding just an S3-gateway can't resolve this problem because the S3-gateway secret/key may also be compromised. Accordingly, there needs to be a way to enforce multi-factor authentication (MFA)-based authentication for restore (read) operations.

In the case where backup software uses Cloud storage as a target for backup data, there is an inherent risk where a bad actor obtains the authentication <key, secret> pair that is used by the backup software and allows full access to the Cloud storage. Once the bad actor has the <key, secret> pair, they can access the storage directly and restore and exfiltrate files. Adding just an S3-gateway can't resolve this problem because the S3-gateway secret/key may also be compromised in the same manner. Accordingly, there needs to be a way to enforce multi-factor authentication (MFA) for restore (read) operations from the Cloud storage.

Figure 13:
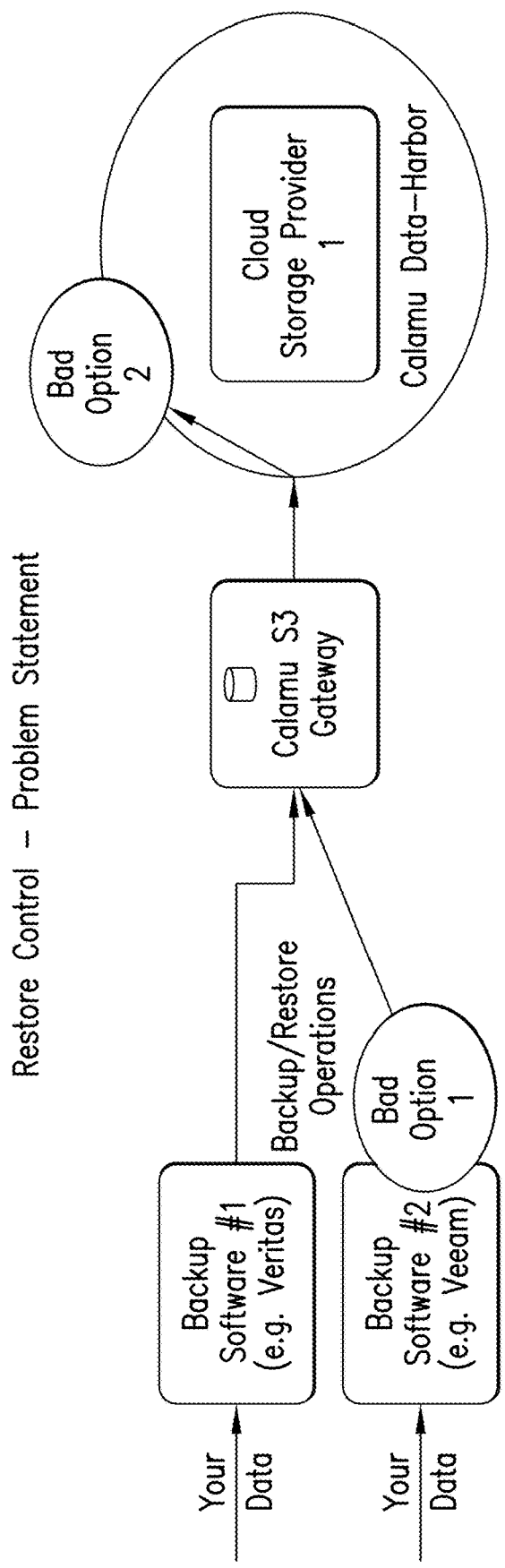
FIG. 13 illustrates deficient solutions for the problem illustrated in FIG. 12.

FIG. 13 sets forth two poor solutions to the scenario presented in FIG. 12. Poor solution 1 entails enforcing MFA when a user tries to restore files via the backup software. This is bad because if the system <secret, key> were stolen, the bad actor doesn't need to use the backup software.

Figure 14B:
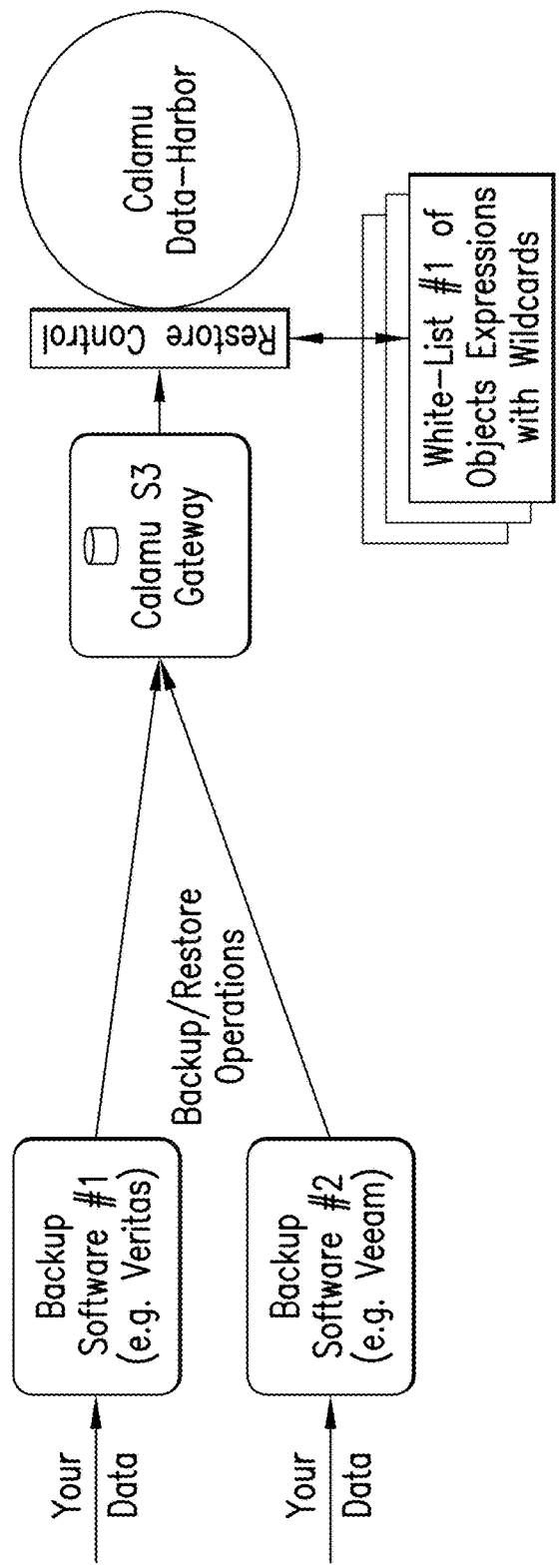

A second poor solution entails enforcing MFA on all reads from the bucket at the cloud provider or enforcing MFA on the first read operation of a sequence of operations that allows further read operations for a specified period. This is bad because backup software typically performs read operations not only when they restore data, but also when they backup data (e.g., they have various status files etc.). If you require MFA for read operations as mentioned above, you will also require it while backing up. This is not good since backups happen every day in a scheduled manner, typically at night FIGS. 14A and 14B present a better solution for enforcing MFA on read operations from the S3 gateway that both protect against the scenario of stolen <key, secret> being used for direct read access and allow continued normal operations of the backup software.

1. The first step is a pre-analysis of a specific backup software during the ordinary course of backup and restore operations. In this analysis, we identify the "read operations pattern" that the backup software generates during backups (not restores). These usually include specific file names or directory names or structure and do NOT include the actual data of the files that are being backed up.

2. Following the above analysis, a "white list" is created that represents the read patterns by using regex expressions. These white lists for supported backup software packages are deployed at the Calamu Data Harbor backend platform to support MFA authentication for read operations from the Cloud storage used by the backup software. This capability is called "Restore Control".

3. When Restore Control is enabled for a Cloud storage (vault) used by some backup software, the following is implemented by the Data Harbor backend:

a. When a read operation is requested from the vault, the source is examined and, based on the request "user-agent", it is determined which specific backup software is requesting the operation. This check does not guarantee that this is indeed the backup software that is requesting this operation, and it still might be a bad actor who mimics the "user agent". However, this check allows us to associate the request with the appropriate white list. The steps below ensure that a bad actor can not gain any advantage from mimicking a backup software "user-agent". If the "user-agent" does not match any supported backup software, an empty white list is used.

b. Once the backup software is identified, the file requested is matched against the chosen whitelist. If there is a match, the request is granted without an MFA process (as this is possibly part of a backup, not a restore). If there is no match, a Restore Control MFA process starts.

c. The read request is being blocked.
      i. A Restore Control request appears in the Data Harbor management console, and a Restore Control notification is sent to the appropriate user(s); i.e., those that have the rights to approve such a request.
      ii. One of the users needs to log in to the Data Harbor management console via a usual interactive MFA and approve the Restore Control request (possibly with a secondary MFA). It is this user's responsibility to verify with the backup software administrator that this request represents a valid restore operation and is not generated by a bad actor trying to access the S3 gateway directly. The approving user can then approve the request which will allow read operations for a specific period that will be sufficient for completion of the restore operation. This period can be extended later on.
      iii. The user who initiated the restore operation from the backup software is being notified and can restart the restore operation at the backup software that will run to completion.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, among other things, provide for improved social networking platforms and aspects thereof. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A cloud-based system for securely storing data formed into cloud technology-specific data objects (hereinafter, "buckets"), comprising:
   a processor configured to:
   obtain original data buckets from a client cloud storage gateway device;
   split the original data buckets into at least three data blocks;
   encrypt the data blocks using an encryption key associated with the data blocks; and
   write the encrypted data blocks across at least three cloud storage providers, each cloud storage provider located in a different physical location, each data block written to at least two but less than all of the cloud storage providers, whereby there is no single cloud storage provider to which all of the data blocks are written; such that if any one cloud storage provider is unavailable, the encrypted data blocks stored thereon may be retrieved from at least one other cloud storage provider; and in the case any one of the cloud storage providers is compromised, the original data cannot be recovered from the encrypted data blocks stored in that cloud storage provider alone;
   create a pointer file containing locations of each of the encrypted data blocks in every cloud storage provider in which they were written;
   store the pointer file in a storage device;
   delete the original data from a client storage device that provided it to the client cloud storage gateway device;
   analyze communications of a specific backup software during the ordinary course of backup and restore operations, including:
   identify at least one read operations pattern that the backup software generates during backups;
   create a white list that represents the identified read patterns using regex expressions; and
   deploy the white list at the backend platform to support multi-factor authentication (MFA) for read operations from the cloud storage used by the backup software as a Restore Control capability.

2. The system of claim 1, the processor being further configured, after the original data is deleted, to:
   detect a condition in one of the clouds that renders it abnormal and unusable;
   abandon the abnormal cloud;
   establish a new cloud to replace the abnormal cloud;
   use the pointer file to:
   identify the encrypted block fragments that were stored in the abnormal cloud; and
   locate at least one normal cloud for each of the identified encrypted block fragments in which that identified encrypted block fragment is stored;
   copy the identified encrypted block fragments from the located normal clouds to the established new cloud; and
   update the pointer file by replacing information contained therein of encrypted block fragments that were stored in the abnormal cloud, with information of corresponding encrypted block fragments stored in the established new cloud.

3. The system of claim 1, wherein the processor is further configured to thereafter:
   obtain encrypted block storage information from the pointer file;
   retrieve the encrypted blocks using the storage information; and
   decrypt and reassemble the retrieved encrypted blocks as the original buckets.

4. The system as recited in claim 1, wherein a client or application accesses the system via an S3 gateway application programming interface (API).

5. The system of claim 1, wherein the processor is further configured to:
   obtain a request to restore a backup stored in the cloud storage; and
   enforce multi-factor authentication (MFA) for restore operations.

6. The system of claim 5, wherein the enforcing multi-factor authentication (MFA) includes issuing a challenge before allowing the backup data to be reconstituted.

7. The system of claim 1, wherein the processor is further configured, after the Restore Control is enabled for a Cloud storage vault used by the backup software, to:
   responsive to a read operation being requested from the vault, examine the source of the request and determine whether the user agent of the request matches a supported backup software:
   in the case the user-agent matches a supported backup software:
   determine which specific backup software is requesting the read operation; and
   associate the request with the appropriate white list for that backup software;
   match the requested file against the whitelist;
   in the case there is a match, grant the request;

in the case there is not a match, block the read request;
in the case the user-agent does not match any supported backup software:
associate the request with an empty white list, and block the read request.

8. The system of claim 7, wherein the processor is further configured, after the read request is blocked, to:
cause a Restore Control request to appear in a back-end management console;
cause a Restore Control notification to be sent to a user having rights sufficient to approve the request;
receive from a user a request to log on to a back-end management console, including an interactive MFA;
authorize the user and allow them to log on to the back-end management console and approve the Restore Control request;
allow read operations for a pre-determined period; and
notify the user who initiated the restore operation that they can restart the restore operation using the backup software; and
responsive to a new request for restore operations received from the initiating user, allow the restore operation to begin and run to completion.

9. A computer implemented method for securely storing data formed into cloud technology-specific data objects (hereinafter, "buckets"), comprising:
causing a processor to complete steps including:
obtaining original data buckets from a client cloud storage gateway device;
splitting the original data buckets into at least three data blocks each; encrypting the data blocks using an encryption key associated with the data blocks;
writing the encrypted data blocks across at least three cloud storage providers, each cloud storage provider located in a different physical location, each data block written to at least two but less than all of the cloud storage providers, whereby there is no single cloud storage provider to which all of the data blocks are written; such that if any one cloud storage provider is unavailable, the encrypted data blocks stored thereon may be retrieved from at least one other cloud storage provider; and in the case any one of the cloud storage providers is compromised, the original data cannot be recovered from the encrypted data blocks stored in that cloud storage provider alone;
creating a pointer file containing locations of the encrypted data blocks in every cloud storage provider to which each of the encrypted data blocks was written;
storing the pointer file in the client cloud storage gateway device;
deleting the original data from the client cloud storage gateway device;
analyze communications of a specific backup software during the ordinary course of backup and restore operations, including:
identify at least one read operations pattern that the backup software generates during backups;
create a white list that represents the identified read patterns using regex expressions; and
deploy the white list at the backend platform to support multi-factor authentication (MFA) for read operations from the cloud storage used by the backup software as a Restore Control capability.

10. The method of claim 9, further causing the processor to complete steps after the original data is deleted, including:
detecting a condition in one of the clouds that renders it abnormal and unusable;
abandoning the abnormal cloud;
establishing a new cloud to replace the abnormal cloud;
using the pointer file to:
identify the encrypted block fragments that were stored in the abnormal cloud; and
locate at least one normal cloud in which each of the identified encrypted block fragments is stored;
copying the identified encrypted block fragments from the located normal clouds to the established new cloud; and
updating the pointer file by replacing information contained therein of encrypted block fragments that were stored in the abnormal cloud, with information of corresponding encrypted block fragments stored in the established new cloud.

11. The method of claim 10, further causing the processor to complete steps including:
obtaining encrypted block storage information from the pointer file;
retrieving the encrypted blocks using the storage information; and
decrypting and reassembling the retrieved encrypted blocks as the original data buckets.

12. The method of claim 9, wherein a client or application accesses the system via an S3 gateway application programming interface (API).

13. The method of claim 9, wherein the processor is further configured to:
obtain a request to restore a backup stored in the cloud storage; and
enforce multi-factor authentication (MFA) for restore operations.

14. The method of claim 13, wherein the enforcing multi-factor authentication (MFA) includes issuing a challenge before allowing the backup data to be reconstituted.

15. The method of claim 9, wherein the processor is further configured, after the Restore Control is enabled for a Cloud storage vault used by the backup software, to:
responsive to a read operation being requested from the vault, examine the source of the request and determine whether the user agent of the request matches a supported backup software:
in the case the user-agent matches a supported backup software:
determine which specific backup software is requesting the read operation; and
associate the request with the appropriate white list for that backup software;
match the requested file against the associated whitelist;
in the case there is a match, grant the request;
in the case there is not a match, block the read request;
in the case the user-agent does not match any supported backup software:
associate the request with an empty white list, and block the read request.

16. The system of claim 15, wherein the processor is further configured, after the read request is blocked, to:
cause a Restore Control request to appear in a back-end management console;
cause a Restore Control notification to be sent to a user having rights sufficient to approve the request;
receive from a user a request to log on to a back-end management console, including an interactive MFA;

authorize the user and allow them to log on to the back-end management console and approve the Restore Control request;
allow read operations for a pre-determined period; and
notify the user who initiated the restore operation that they can restart the restore operation using the backup software; and
responsive to a new request for restore operations received from the initiating user, allow the restore operation to begin and run to completion.

* * * * *